Patented Feb. 17, 1942

2,273,518

UNITED STATES PATENT OFFICE 2,273,518

METHOD OF INSULATING ELECTRICAL CONDUCTORS

Walter E. Gloor, Milltown, N. J., assignor to Hercules Powder Company, Wilmington, Del., a corporation of Delaware No Drawing. Application May 31, 1939, Serial No. 276,645

10 Claims. (Cl. 91—70)

This invention relates to an insulated electrical conductor.

An insulating composition for electrical conductors, which has the properties of being tough, shock resistant, resistant to water and various petroleum type solvents and at the same time providing excellent insulation for the electrical conductor, has been the objective of the prior art for many years. Many compositions have been proposed but all of them have lacked one or more of the above properties; and while electrical conductors, insulated with such compositions were used for lack of something better, the shortcomings of such conductors, because of the defects in the insulating compositions, were clearly recognized.

It is an object of this invention to provide an electrical conductor, insulated with a composition which is tough and shock resistant, which has excellent electrical resistance, and which is also resistant to water, gasoline, and various petroleum oils, thus producing an insulated electrical conductor which will be found to be highly efficient, due to these properties of the insulating composition.

Other objects will appear from a description of the invention which follows:

The objects of my invention are accomplished with an insulated electrical conductor, comprising an electrical conductor insulated with a composition comprising ethyl cellulose and substantially petroleum hydrocarbon-insoluble resin derived from pine wood. Such an insulated electrical conductor has excellent electrical characteristics, is very resistant to water and gasoline, is tough, flexible, and shock resistant. I have found that an electrical conductor, insulated with a composition comprising these ingredients, with or without the addition of various modifying agents is markedly superior to prior art insulated electrical conductors.

It is to be understood that the term "electrical conductor" as used herein refers to conductors of any type or form. The conductor may be wholly uninsulated and my compositions applied directly thereto or the conductor may already be insulated with various prior art materials, and my compositions may be applied to such conductors.

The resinous constituent used in the insulating composition in accordance with the present invention may be prepared by extracting pine wood with a coal tar hydrocarbon, such as benzol or toluol, then evaporating the volatile constituents, leaving a residue consisting of a mixture of wood rosin and the resin used in the present compositions. Extraction of this mixture with a petroleum hydrocarbon such as, for example, gasoline, dissolves the rosin and after separation of the rosin, high in abietic acid, a resinous residue remains which is low in abietic acid. This residue, used in the compositions of the present invention, is characterized by substantial insolubility in petroleum hydrocarbons, but it will vary somewhat in its specific characteristics such as acid number, melting point, exact petroleum ether solubility, and content of naphtha and toluol insoluble material, depending upon the method used for the recovery of rosin from pine wood. This resin, used in the compositions of the present invention, and hereinafter called substantially petroleum hydrocarbon-insoluble resin derived from pine wood, is more fully described and claimed in U. S. Patent 2,193,026, issued March 12, 1940, to Lucius C. Hall.

The exact chemical composition of the extracted substantially petroleum hydrocarbon insoluble resin is not known. However, it is distinguished by having a methoxy content of about 3–6%, which clearly differentiates it from oxidized wood rosin (0.3–0.4% methoxy) and gum rosin (0.1–0.2% methoxy). It is also characterized by substantial insolubility in light petroleum hydrocarbons, as has been mentioned, and by solubility in alcohol. A typical sample of this extracted resin may have a melting point of 125° C. by the A. S. T. M. drop method, an acid number of 100; naphtha-insoluble matter, 98%; petroleum ether-insoluble matter, 96%; gasoline-soluble, 8%; water soluble, 0%; although the exact figures mentioned are subject to variation according to the exact method of extraction and separation of the rosin therefrom, and according to whether the resin has been heat treated or not.

It may be desirable, though not essential, in the production of insulated electrical conductors in accordance with the present invention to subject the substantially petroleum hydrocarbon-insoluble resin derived from pine wood to heat treatment prior to its use in the insulating compositions of this invention in order to avoid excess foaming during the process of preparing these compositions. By way of illustration, the resin may desirably be treated at a temperature from about 150° C. to about 325° C. for a period from about 10 minutes to about 2 hours, depending upon the temperature.

The ethyl cellulose used in the insulating compositions of this invention will be sufficiently etherified to be insoluble in inorganic solvents and may have an ethoxy content from about 43% to about 51%, preferably from about 44% to about 48%. The viscosity characteristics of the ethyl cellulose used will depend upon the properties desired in the ultimate composition. Where, for example, a very viscous composition is required, and only a relatively small amount of ethyl cellulose may be used, a high viscosity product is indicated. On the other hand, where a fluid composition is desirable, and at the same time a relatively large amount of ethyl cellulose, a low viscosity product is indicated. In general, I have found that an ethyl cellulose is satisfactory which has a viscosity characteristic from about 2 seconds to about 500 seconds, preferably from about 3 seconds to about 80 seconds, as measured by noting the time of fall of a $\frac{1}{8}$ inch steel ball in a 25 mm. glass tube through 10 inches of a solution at 25° C., consisting of 20% by weight of ethyl cellulose dissolved in a mixture consisting of 80% by weight of toluol and 20% by weight of ethyl alcohol.

In order to prepare the composition as an insulating material for electrical conductors of various kinds, the substantially petroleum hydrocarbon-insoluble resin derived from pine wood and ethyl cellulose are first blended together by heating, in the complete absence of volatile solvents. This may be done by heating the said resin to a temperature of about 180° C. to 200° C., at which temperature the resin is in a fluid condition. While vigorously stirring this hot resinous mass, the ethyl cellulose is added thereto and since the hot resin acts as a solvent for the ethyl cellulose, it is dispersed. While the ethyl cellulose is being added, the above temperature is maintained and stirring is used to hasten dispersion of the ethyl cellulose in the resinous mass. In view of the high temperature used, it is advisable to disperse the ethyl cellulose in the resinous mass as quickly as possible in order to avoid possible degradation of the ethyl cellulose if kept at this elevated temperature too long. Complete dispersion of the ethyl cellulose is obtained when the foaming subsides and disappears. This foaming is probably caused by moisture and air which is trapped in the individual ethyl cellulose particles when the hot resin solvent forms a gelled layer about each particle. The molten composition so prepared is then ready for application.

For particular insulating purposes, it may be desirable to modify the composition containing the ethyl cellulose and resin alone. This may be accomplished by the addition of various modifiers, such as plasticizers, oils, waxes and fillers. These modifiers may be added to the resin and the mixture then heated as shown and the ethyl cellulose dispersed in this molten mixture, or the ethyl cellulose may first be dispersed in the resin and the modifiers then added to the molten mixture. In the case of waxes, plasticizers and oils, the former alternative is preferable while in the case of fillers it is preferable to use the latter alternative. In all cases, however, these modifiers must be so chosen that they do not materially detract from the excellent electrical resistance of the composition containing only the resin and ethyl cellulose. Among these modifying substances, I have successfully used the following: Solvent plasticizers for the ethyl cellulose, such as, dibutyl phthalate, tricresyl phosphate, chlorinated naphthalene, coal tar, and stearin pitch; glyceride oils, such as raw and bodied castor oils, and soya bean oil; waxes, such as paraffin wax, crude and purified montan wax, beeswax, carnauba wax and Japan wax; and fillers, such as, mica and talc.

The formulation of the insulating compositions to be used for application to various electrical conductors, will naturally vary quite widely depending upon various factors, such as the particular use to which the insulated electrical conductor is to be put, the characteristics of the conductor which is insulated, etc. In general, however, the substantially petroleum hydrocarbon-insoluble resin derived from pine wood will comprise from about 40% by weight to about 95% by weight of the composition, and the ethyl cellulose will comprise from about 5% by weight to about 35% by weight of the composition. When waxes, oils, and plasticizers are used for the modification of the composition, up to about 25% by weight of the composition may be used. Similarly, fillers may be used up to about 20% by weight of the composition.

In preparing an insulated electrical conductor, in accordance with this invention, a molten composition, as prepared above, may be applied to electrical conductors of any type or form by various means. In the production of a transformer coil, for example, the coil may be wound as usual, using a wire already partially insulated with cloth, paper, etc., the coil being of any desired form or capacity. After assembly of the coil, and preferably after thorough drying it may be completely electrically insulated by placing said coil in a tank containing a molten composition comprising ethyl cellulose and substantially petroleum hydrocarbon-insoluble resin derived from pine wood with or without modifying agents, as desired. After the desired impregnation or coating has been effected by this composition, the excess thereof may be drained off. On cooling, the coil will be found to be efficiently insulated. In view of the high resistance to impulse tests and the insolubility of my compositions in transformer oils, it will be found that coils insulated in this manner are extremely advantageous for all transformer installations. The compositions of this invention are also suitable for potting the coils.

It will be understood that other means may be used for applying the insulated compositions to various electrical conductors. In the case of wire, wholly uninsulated or insulated by various prior art means the compositions before set forth may also be applied by dipping. Furthermore, cloth or paper may, for example, be coated with these compositions by roller coating, followed by a hot doctor blade to remove the excess. This coated cloth or paper may then be used for insulating an electrical conductor.

The temperature at which my compositions are applied to various electrical conductors will vary somewhat, depending upon such factors for example, as the viscosity of the composition being used, the nature of the article being coated, the particular means being used for applying the composition, etc. In general, these compositions may be applied over a temperature range from about 125° C. to about 180° C., preferably, however, the range of application temperature will be from about 135° C. to about 150° C.

The following table shows typical compositions which may be used in combination with an electrical conductor to produce an insulated electrical conductor having excellent electrical characteristics. All of these compositions may be applied in the molten state in any of the ways before shown. In the following table, the formulae are shown in parts by weight. The terms "high viscosity," "medium viscosity," etc., appearing after the ethyl cellulose, refer to the viscosity characteristics thereof, determined in the manner before stated. On the basis of their viscosity characteristic, the ethyl celluloses are classified as follows:

|  | Seconds |
|---|---|
| High viscosity | 60–80 |
| Medium viscosity | 20–30 |
| Low viscosity | 6– 8 |
| Extra low viscosity | 3– 4 |

*Table I*

|  | Formula ||||||
|---|---|---|---|---|---|---|
|  | 1 | 2 | 3 | 4 | 5 | 6 |
| Ethyl cellulose (high viscosity) | 16.7 | 15.9 | | | | |
| Ethyl cellulose (medium viscosity) | | | 13.4 | 20.0 | 25.0 | |
| Ethyl cellulose (low viscosity) | | | | | | 30.0 |
| Petroleum hydrocarbon-insoluble resin derived from pine wood | 83.3 | 79.1 | 66.6 | 60.0 | 55.0 | 50.0 |
| Dibutyl phthalate | | 5.0 | 10.0 | 10.0 | 10.0 | 10.0 |
| Raw castor oil | | | 10.0 | 10.0 | 10.0 | 10.0 |

*Table I—Continued*

|  | Formula |||||||
|---|---|---|---|---|---|---|---|
|  | 7 | 8 | 9 | 10 | 11 | 12 | 13 | 14 |
| Ethyl cellulose (medium viscosity) | | | | | | 10.0 | 18.0 | 18.8 |
| Ethyl cellulose (low viscosity) | | 30.0 | 35.0 | 30.0 | 25.0 | | | |
| Ethyl cellulose (extra low viscosity) | 30.0 | | | | | | | |
| Petroleum hydrocarbon-insoluble resin derived from pine wood | 50.0 | 50.0 | 45.0 | 40.0 | 40.0 | 65.0 | 75.0 | 62.5 |
| Dibutyl phthalate | 5.0 | 5.0 | | | 10.0 | | | |
| Raw castor oil | 15.0 | 15.0 | 20.0 | 10.0 | | 25.0 | 7.0 | |
| Crude montan wax | | | | 20.0 | 25.0 | | | |
| Chlorinated paraffin (56% Cl₂) | | | | | | | | 18.7 |

It will be understood that the details and examples given hereinbefore are illustrative only and in no way limiting on my invention as broadly described hereinbefore and in the appended claims.

What I claim and desire to protect by Letters Patent is:

1. In the preparation of electrical equipment comprising an electrical conductor and insulation therefor, the improvement which consists in subjecting the said conductor to immersion in a heat-stable, molten composition consisting essentially of ethyl cellulose and pine wood resin distinguished by substantial insolubility in petroleum hydrocarbons, solubility in alcohol, and by a methoxyl content of between about 3% and about 6% until the conductor is protected and insulated by the composition.

2. In the preparation of electrical equipment comprising an electrical conductor and insulation therefor, the improvement which consists in subjecting the said conductor to immersion in a heat-stable, molten composition consisting essentially of pine wood resin distinguished by substantial insolubility in petroleum hydrocarbons, solubility in alcohol, and by a methoxyl content of between about 3% and about 6%, ethyl cellulose, and a non-volatile modifier until the conductor is protected and insulated by the composition.

3. In the preparation of electrical equipment comprising an electrical conductor and insulation therefor, the improvement which consists in subjecting the said conductor to immersion in a heat-stable, molten composition comprising ethyl cellulose and pine wood resin distinguished by substantial insolubility in petroleum hydrocarbons, solubility in alcohol, and by a methoxyl content of between about 3% and about 6%, while maintaining the molten composition at a temperature between about 125° C. and about 180° C., until the conductor is protected and insulated by the composition.

4. In the preparation of electrical equipment comprising an electrical conductor and insulation therefor, the improvement which consists in subjecting the said conductor to immersion in a heat-stable, molten composition containing about 5% to about 35% ethyl cellulose; about 40% to about 90% of the pine wood resin distinguished by substantial insolubility in petroleum hydrocarbons, solubility in alcohol and by a methoxyl content of between about 3% and about 6%; 0 to about 25% of a non-volatile plasticizer; 0 to about 20% of a filler; and 0 to about 25% of a wax; while maintaining the molten composition at a temperature between about 125° C. and 180° C., until the conductor is protected and insulated by the composition.

5. In the preparation of electrical equipment comprising an electrical conductor and insulation therefor, the improvement which consists in subjecting the said conductor to immersion in a heat-stable, molten composition consisting of ethyl cellulose, pine wood resin distinguished by substantial insolubility in petroleum hydrocarbons, solubility in alcohol, and by a methoxyl content of between about 3% and about 6%, and tricresyl phosphate as a plasticizer therefor, the molten composition being held at a temperature between about 125° C. and about 180° C., until the conductor is protected and insulated by the composition.

6. In the preparation of electrical equipment comprising an electrical conductor and insulation therefor, the improvement which consists in subjecting the said conductor to immersion in a heat-stable, molten composition consisting of ethyl cellulose, pine wood resin distinguished by substantial insolubility in petroleum hydrocarbons, solubility in alcohol and by a methoxyl content of between about 3% and about 6%, and castor oil as a plasticizer therefor, the molten composition being held at a temperature between about 125° C. and about 180° C., until the conductor is protected and insulated by the composition.

7. In the preparation of electrical equipment comprising a coil, fibrous insulation of the character of cloth, paper and the like, and an impregnant therefor, the improvement which consists in subjecting the coil to immersion in a heat-stable, molten composition consisting substantially of ethyl cellulose and pine wood resin distinguished by substantial insolubility in petroleum hydrocarbons, solubility in alcohol and a methoxyl content of between about 3% and about 6%, until the coil is protected and insulated by the composition.

8. In the preparation of electrical equipment comprising a coil, fibrous insulation of the character of cloth, paper and the like, and an impregnant therefor, the improvement which consists in subjecting the coil to immersion in a heat-stable, molten composition consisting substantially of pine wood resin distinguished by substantial insolubility in petroleum hydrocarbons, solubility in alcohol, and by a methoxyl content of between about 3% and about 6%, ethyl cellulose, and a non-volatile modifier, until the coil is protected and insulated by the composition.

9. In the preparation of electrical equipment comprising a coil, fibrous insulation of the character of cloth, paper and the like, and an impregnant therefor, the improvement which consists in subjecting the coil to immersion in a heat-stable, molten composition comprising ethyl cellulose and pine wood resin distinguished by substantial insolubility in petroleum hydrocarbons, solubility in alcohol, and by a methoxyl content of between about 3% and about 6%, while maintaining the molten composition at a temperature between about 125° C. and about 180° C., until the coil is protected and insulated by the composition.

10. In the preparation of electrical equipment comprising a coil, fibrous insulation of the character of cloth, paper and the like, and an impregnant therefor, the improvement which consists in subjecting the coil to immersion in a heat-stable, molten composition containing about 5% to about 35% ethyl cellulose; about 40% to about 90% of the pine wood resin distinguished by substantial insolubility in petroleum hydrocarbons, solubility in alcohol and by a methoxyl content of between about 3% and about 6%; 0 to about 25% of a non-volatile plasticizer; 0 to about 20% of a filler; and 0 to about 25% of a wax, while maintaining the molten composition at a temperature between about 125° C. and 180° C., until the coil is protected and insulated by the composition.

WALTER E. GLOOR.